United States Patent
Aholainen et al.

(10) Patent No.: US 7,589,726 B2
(45) Date of Patent: *Sep. 15, 2009

(54) SERVICE/DEVICE INDICATION WITH GRAPHICAL INTERFACE

(75) Inventors: Markus Aholainen, Pirkkala (FI); Arto Palin, Lempäää (FI)

(73) Assignee: Nokia Corporation, Espoo (FI)

( * ) Notice: Subject to any disclaimer, the term of this patent is extended or adjusted under 35 U.S.C. 154(b) by 266 days.

This patent is subject to a terminal disclaimer.

(21) Appl. No.: 10/977,258

(22) Filed: Nov. 1, 2004

(65) Prior Publication Data

US 2005/0073522 A1    Apr. 7, 2005

Related U.S. Application Data

(63) Continuation of application No. 10/101,688, filed on Mar. 21, 2002, now Pat. No. 7,102,640.

(51) Int. Cl.
*G06T 11/20* (2006.01)
*G06F 15/177* (2006.01)
*G06F 3/048* (2006.01)
*G06F 3/00* (2006.01)

(52) U.S. Cl. .................. 345/440; 715/736; 715/837; 710/19

(58) Field of Classification Search ............ 455/43.2–3, 455/421, 556.1–2, 566, 574, 41.2–41.3; 345/440–441, 345/156; 715/733–740, 810, 864, 763, 779, 715/837; 370/274; 710/19

See application file for complete search history.

(56) References Cited

U.S. PATENT DOCUMENTS 5,493,692 A    2/1996    Theimer et al.
(Continued)

FOREIGN PATENT DOCUMENTS

AU    200135071    10/2001
(Continued)

OTHER PUBLICATIONS

U.S. Appl. No. 10/504,410, filed Aug. 13, 2004, Hamberg.
(Continued)

*Primary Examiner*—Ryan R Yang
(74) *Attorney, Agent, or Firm*—Locke Lord Bissell & Liddell

(57) ABSTRACT

The method disclosed gives the user rapid notice of those Bluetooth devices within communication range, and yet it selectively blocks any notice about Bluetooth devices that the user wishes to ignore. Bluetooth server devices can indicate to the user's Bluetooth client device the service the server device has available by sending service/device icon information to Bluetooth client device. This information can be a value in the class-of-device (CoD) field of a frequency hop synchronization (FHS) packet that it sends during the process of exchanging inquiry and paging packets with the Bluetooth client device. If the server device has begun by transmitting an inquiry packet, then the CoD value will be sent in its paging packet. If the server device is responding to an inquiry, then its CoD value will be in its inquiry response packet. Alternately, the service/device icon information can be sent after a connection has been made with the client device, as part of a Service Discovery Protocol (SDP) response packet.

38 Claims, 7 Drawing Sheets

U.S. PATENT DOCUMENTS

| | | | |
|---|---|---|---|
| 5,606,617 A | 2/1997 | Brands | |
| 5,668,878 A | 9/1997 | Brands | |
| 5,696,827 A | 12/1997 | Brands | |
| 5,749,081 A | 5/1998 | Whiteis | |
| 5,790,974 A | 8/1998 | Tognazzini | |
| 5,835,061 A | 11/1998 | Stewart | |
| 5,838,685 A | 11/1998 | Hochman | |
| 5,903,832 A * | 5/1999 | Seppanen et al. | 455/435.3 |
| 5,987,099 A | 11/1999 | O'Neill et al. | |
| 6,006,200 A | 12/1999 | Boies et al. | |
| 6,023,241 A | 2/2000 | Clapper | |
| 6,041,311 A | 3/2000 | Chislenko et al. | |
| 6,044,062 A | 3/2000 | Brownrigg et al. | |
| 6,049,777 A | 4/2000 | Sheena et al. | |
| 6,052,467 A | 4/2000 | Brands | |
| 6,064,980 A | 5/2000 | Jacobi et al. | |
| 6,065,012 A | 5/2000 | Balsara et al. | |
| 6,092,049 A | 7/2000 | Chislenko et al. | |
| 6,108,493 A | 8/2000 | Miller et al. | |
| 6,108,688 A | 8/2000 | Nielsen | |
| 6,119,101 A | 9/2000 | Peckover | |
| 6,134,445 A | 10/2000 | Gould et al. | |
| 6,138,158 A | 10/2000 | Boyle et al. | |
| 6,138,159 A | 10/2000 | Phaal | |
| 6,167,278 A | 12/2000 | Nilssen | |
| 6,175,743 B1 | 1/2001 | Alperovich et al. | |
| 6,182,050 B1 | 1/2001 | Ballard | |
| 6,195,651 B1 | 2/2001 | Handel et al. | |
| 6,195,657 B1 | 2/2001 | Rucker et al. | |
| 6,195,712 B1 * | 2/2001 | Pawlowski et al. | 710/19 |
| 6,199,099 B1 | 3/2001 | Gershman et al. | |
| 6,205,472 B1 | 3/2001 | Gilmour | |
| 6,225,997 B1 * | 5/2001 | Mitsuoka et al. | 715/846 |
| 6,236,768 B1 | 5/2001 | Rhodes et al. | |
| 6,243,581 B1 | 6/2001 | Jawanda | |
| 6,253,202 B1 | 6/2001 | Gilmour | |
| 6,253,203 B1 | 6/2001 | O'Flaherty et al. | |
| 6,255,800 B1 * | 7/2001 | Bork | 320/115 |
| 6,263,447 B1 | 7/2001 | French et al. | |
| 6,266,048 B1 | 7/2001 | Carau, Sr. | |
| 6,272,129 B1 | 8/2001 | Dynarski et al. | |
| 6,275,824 B1 | 8/2001 | O'Flaherty et al. | |
| 6,285,879 B1 | 9/2001 | Lechner et al. | |
| 6,317,781 B1 | 11/2001 | De Boor et al. | |
| 6,321,257 B1 | 11/2001 | Kotola et al. | |
| 6,330,448 B1 | 12/2001 | Otsuka et al. | |
| 6,351,271 B1 | 2/2002 | Mainwaring et al. | |
| 6,414,955 B1 | 7/2002 | Clare et al. | |
| 6,421,707 B1 | 7/2002 | Miller et al. | |
| 6,430,395 B2 | 8/2002 | Arazi et al. | |
| 6,430,413 B1 | 8/2002 | Wedi et al. | |
| 6,438,585 B2 | 8/2002 | Mousseau et al. | |
| 6,445,921 B1 | 9/2002 | Bell | |
| 6,477,373 B1 | 11/2002 | Rappaport et al. | |
| 6,484,196 B1 | 11/2002 | Maurille | |
| 6,493,550 B1 | 12/2002 | Raith | |
| 6,496,849 B1 | 12/2002 | Hanson et al. | |
| 6,510,381 B2 | 1/2003 | Grounds et al. | |
| 6,515,974 B1 | 2/2003 | Inoue et al. | |
| 6,519,453 B1 | 2/2003 | Hamada et al. | |
| 6,527,641 B1 | 3/2003 | Sinclair et al. | |
| 6,539,225 B1 | 3/2003 | Lee | |
| 6,542,740 B1 | 4/2003 | Olgaard et al. | |
| 6,546,263 B1 * | 4/2003 | Petty et al. | 455/566 |
| 6,549,768 B1 | 4/2003 | Fraccaroli | |
| 6,554,707 B1 | 4/2003 | Sinclair et al. | |
| 6,560,456 B1 | 5/2003 | Lohtia et al. | |
| 6,580,698 B1 | 6/2003 | Nitta | |
| 6,601,093 B1 * | 7/2003 | Peters | 709/220 |
| 6,604,140 B1 * | 8/2003 | Beck et al. | 709/226 |
| 6,625,460 B1 | 9/2003 | Patil | |
| 6,643,650 B1 * | 11/2003 | Slaughter et al. | 707/10 |
| 6,674,403 B2 | 1/2004 | Gray et al. | |
| 6,678,516 B2 | 1/2004 | Nordman et al. | |
| 6,697,018 B2 | 2/2004 | Stewart | |
| 6,714,519 B2 * | 3/2004 | Luzzatti et al. | 370/252 |
| 6,721,542 B1 | 4/2004 | Anttila et al. | |
| 6,744,753 B2 | 6/2004 | Heinonen et al. | |
| 6,785,542 B1 | 8/2004 | Blight et al. | |
| 6,862,276 B1 | 3/2005 | Abrol et al. | |
| 6,862,594 B1 * | 3/2005 | Saulpaugh et al. | 707/10 |
| 6,917,960 B1 | 7/2005 | Decasper et al. | |
| 2001/0007820 A1 | 7/2001 | Do et al. | |
| 2001/0021649 A1 | 9/2001 | Kinnunen et al. | |
| 2001/0029166 A1 * | 10/2001 | Rune et al. | 455/41 |
| 2001/0034223 A1 | 10/2001 | Rieser et al. | |
| 2001/0039546 A1 | 11/2001 | Moore et al. | |
| 2002/0002705 A1 | 1/2002 | Byrnes et al. | |
| 2002/0006788 A1 | 1/2002 | Knutsson et al. | |
| 2002/0013815 A1 | 1/2002 | Obradovich et al. | |
| 2002/0015042 A1 * | 2/2002 | Robotham et al. | 345/581 |
| 2002/0019882 A1 | 2/2002 | Soejima et al. | |
| 2002/0022453 A1 | 2/2002 | Balog et al. | |
| 2002/0052873 A1 | 5/2002 | Delgado et al. | |
| 2002/0061741 A1 | 5/2002 | Leung et al. | |
| 2002/0065881 A1 | 5/2002 | Mansikkaniemi et al. | |
| 2002/0082921 A1 * | 6/2002 | Rankin | 705/14 |
| 2002/0083025 A1 | 6/2002 | Robarts et al. | |
| 2002/0083121 A1 * | 6/2002 | Chang et al. | 709/201 |
| 2002/0094778 A1 | 7/2002 | Cannon et al. | 455/41 |
| 2002/0097433 A1 * | 7/2002 | Chang et al. | 358/1.15 |
| 2002/0116458 A1 * | 8/2002 | Bricklin et al. | 709/204 |
| 2002/0123325 A1 * | 9/2002 | Cooper | 455/411 |
| 2002/0126872 A1 | 9/2002 | Brunk et al. | |
| 2002/0150050 A1 * | 10/2002 | Nathanson | 370/241 |
| 2002/0156795 A1 * | 10/2002 | Edwards et al. | 707/103 R |
| 2002/0158917 A1 | 10/2002 | Sinclair et al. | |
| 2002/0173877 A1 * | 11/2002 | Zweig | 700/245 |
| 2002/0178211 A1 * | 11/2002 | Singhal et al. | 709/201 |
| 2002/0191017 A1 | 12/2002 | Sinclair et al. | |
| 2002/0193073 A1 | 12/2002 | Fujioka | |
| 2002/0198882 A1 | 12/2002 | Linden et al. | |
| 2003/0002504 A1 | 1/2003 | Forstadius | |
| 2003/0008662 A1 | 1/2003 | Stern et al. | |
| 2003/0013459 A1 | 1/2003 | Rankin et al. | |
| 2003/0027636 A1 | 2/2003 | Covannon et al. | |
| 2003/0036350 A1 * | 2/2003 | Jonsson et al. | 455/41 |
| 2003/0054794 A1 | 3/2003 | Zhang | |
| 2003/0069921 A1 * | 4/2003 | Lamming et al. | 709/203 |
| 2003/0092376 A1 | 5/2003 | Syed | |
| 2003/0115038 A1 | 6/2003 | Want et al. | |
| 2003/0119446 A1 * | 6/2003 | Fano et al. | 455/41 |
| 2003/0119494 A1 * | 6/2003 | Alanara et al. | 455/421 |
| 2003/0140246 A1 | 7/2003 | Kammer et al. | |
| 2003/0149823 A1 * | 8/2003 | Newman et al. | 710/305 |
| 2003/0171147 A1 | 9/2003 | Sinclair et al. | |
| 2003/0177113 A1 | 9/2003 | Wakita | |
| 2003/0208536 A9 * | 11/2003 | Lee et al. | 709/204 |
| 2003/0208595 A1 * | 11/2003 | Gouge et al. | 709/225 |
| 2004/0073793 A1 | 4/2004 | Takeda | |
| 2004/0171379 A1 * | 9/2004 | Cabrera et al. | 455/422.1 |
| 2004/0181517 A1 | 9/2004 | Jung et al. | |
| 2004/0181540 A1 | 9/2004 | Jung et al. | |
| 2004/0190529 A1 * | 9/2004 | Hara | 370/395.42 |
| 2004/0202132 A1 | 10/2004 | Heinonen et al. | |
| 2005/0169214 A1 * | 8/2005 | Suomela | 370/331 |
| 2005/0260996 A1 | 11/2005 | Groenendaal | |
| 2005/0277418 A1 * | 12/2005 | Singhal et al. | 455/439 |
| 2006/0170967 A1 * | 8/2006 | Maki et al. | 358/1.15 |
| 2006/0173781 A1 * | 8/2006 | Donner | 705/50 |

FOREIGN PATENT DOCUMENTS

| | | |
|---|---|---|
| BE | 1010909 | 3/1999 |

| | | |
|---|---|---|
| CN | 1155823 A | 7/1997 |
| CN | 1305286 A | 7/2001 |
| DE | 198 14 162 A1 | 10/1999 |
| EP | 0 788 065 | 8/1997 |
| EP | 0 891 110 | 1/1999 |
| EP | 0 944 176 | 9/1999 |
| EP | 1 041 849 | 10/2000 |
| EP | 1 107 512 A | 6/2001 |
| EP | 1 130 869 | 9/2001 |
| EP | 1 72 991 A1 | 1/2002 |
| EP | 1 187 023 | 3/2002 |
| EP | 1217792 | 6/2002 |
| EP | 1282289 | 2/2003 |
| JP | 01-111401 | 4/1989 |
| WO | WO 97/10547 A | 3/1997 |
| WO | WO 97/49255 | 12/1997 |
| WO | WO 99/20060 A | 4/1999 |
| WO | WO 99/32985 | 7/1999 |
| WO | WO 99/37105 | 7/1999 |
| WO | WO 99/51048 | 10/1999 |
| WO | WO 99/66428 | 12/1999 |
| WO | WO 00/11563 | 3/2000 |
| WO | WO 00/11793 | 3/2000 |
| WO | WO 00/32002 | 6/2000 |
| WO | WO 00/67435 A | 11/2000 |
| WO | WO 00/69202 | 11/2000 |
| WO | WO 00/74424 | 12/2000 |
| WO | WO 01/33797 A | 5/2001 |
| WO | WO 01/35253 | 5/2001 |
| WO | WO 01/35269 | 5/2001 |
| WO | WO 01/39577 | 6/2001 |
| WO | WO 01/46826 | 6/2001 |
| WO | WO 01/50299 | 7/2001 |
| WO | WO 01/67799 | 9/2001 |
| WO | WO 01/69864 A2 | 9/2001 |
| WO | WO 01/82532 | 11/2001 |
| WO | WO 01/86419 | 11/2001 |
| WO | WO 01/97433 A2 | 12/2001 |
| WO | WO 02/03626 | 1/2002 |
| WO | WO 02/11456 | 2/2002 |
| WO | WO 03/017592 | 2/2003 |
| WO | WO 03/088578 A1 | 10/2003 |
| WO | WO 2004/004372 | 1/2004 |

OTHER PUBLICATIONS

U.S. Appl. No. 09/854,635, filed May 15, 2001, Kaita et al.
U.S. Appl. No. 09/950,773, filed Sep. 13, 2001, Kaita et al.
U.S. Appl. No. 09/985,044, filed Nov. 1, 2001, Heinonen et al.
U.S. Appl. No. 09/985,192, filed Nov. 1, 2001, Heinonen et al.
U.S. Appl. No. 10/073,200, filed Feb. 13, 2002, Hamberg et al.
U.S. Appl. No. 09/406,596, filed Sep. 24, 1999, Schultz et al.
U.S. Appl. No. 10/504,410, filed Aug. 13, 2004, Aholainen et al.
Bisdikian et al. "Quest in a Tetherless World", Wireless Communications and Mobile Computing, 2002, 2:449-464.
http://www.symbian.com/developer/techlib/v70docs/SDL_v7.0/doc_source/DevGuides/cpp/Bluetooth/UsingBluetoothSockets/HowToFindAnd ConnectToADevice/Howtoselectaservice.html; Symbian.
Peddemors et al. "Combining Presence, Location and Instant Messaging in a Context-Aware Mobile Application Framework" Gigamobile/D2.8, 2002, https://wwdoc.telin.nl/dscgi/ds.py/Get/File-21982/PLIM_d28.pdf.
Bluetooth Specification, "Bluetooth Assigned Numbers, Appendix VIII", Version 1.0B, Nov. 29, 1999, pp. 1010-1032.
Bluetooth Specification "Service Discovery Protocol" Version 1.0B, Nov. 29, 1999, pp. 324-1082.
Haartsen "Bluetooth—The Universal Radio Interface for AD HOC, Wireless Connectivity", Ericsson Review No. 3, 1998, pp. 110-117.
U.S. Appl. No. 10/954,197, filed Oct. 1, 2004, Malinen et al.
Forner, "A Multi-Agent Referral System for Matchmaking", MIT Media Lab, Apr. 22, 1996, pp. 245-261.
http://www.saycupid.com, Aug. 13, 2003, 2 pp.
http://www.commerce. usask.ca/faculty/linksE_commerce/lovegety.htm, Aug. 13, 2003, 2 pp.
http://www.genesconnected.co.uk, Aug. 13, 2003, 1 pp.
http://www.amazon.com.exec/obidos/subst/home/home.htm1/02202250..., Aug. 13, 2003, 4 pp.
http://www.ebay.com, Aug. 13, 2003, 2 pp.
Chinese Office Action dated Feb. 16, 2007.

* cited by examiner

SERVICE/DEVICE INDICATION WITH GRAPHICAL INTERFACE

CROSS REFERENCE TO A RELATED APPLICATION

This application for letters patent is a continuation application and hereby incorporates by reference the parent application, U.S. patent application Ser. No. 10/101,688, filed on Mar. 21, 2002, entitled "SERVICE/DEVICE INDICATION WITH GRAPHICAL USER INTERFACE".

FIELD OF THE INVENTION

The invention disclosed broadly relates to ubiquitous computing and more particularly relates to improvements in short range RF technology.

BACKGROUND OF THE INVENTION

Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a frequency hop synchronization (FHS) packet containing all of the information required by the inquiring device to address the responding device. This information includes clock value of the sender (i.e., the responding device), the sender's correct device access code, and the class-of-device (CoD) field. The FHS packet contains more information than is mentioned here. The access code includes the lower address part (LAP) and the upper address part (UAP) of the sender's Bluetooth Device Address (BD_ADDR), a unique, 48-bit IEEE address that is electronically engraved into each Bluetooth device.

The class-of-device (CoD) field of the FHS packet indicates which device class the sender belongs to, such as printer access point, network access point, PDA, cellular telephone, and the like. The class-of-device (CoD) field is a 24 bit field divided into three subfields and a two-bit format field. The high order eleven bit subfield is reserved for indicating general service classes such as information, telephony, audio, object transfer, capturing, rendering, networking, and positioning. The middle five bit subfield comprises the major device class, which can indicate up to 32 different device types. The low order six bit subfield consists is the minor device class, which can indicate up to 64 different variations of each device type. The lowest order two bits are the format field for identifying the format type of the CoD field.

The inquiring device (after it sends a paging packet) will become the master and the responding device will become the slave in the eventual piconet, if a connection is established. To establish a connection, the inquiring device must enter the page state. The paging device uses the information provided in the inquiry response packet, to prepare and send a paging message to the responding device. The paging device uses the estimated clock CLKE and access code of the responding device (i.e., the eventual slave device) to temporarily synchronize with it. Since the paging device intends to be the master, it includes an assignment of an active member address (AM_ADDR) in the paging message. The paging message sent by the paging device is also a frequency hop synchronization (FHS) packet containing all of the information required by the responding device to directly reply to the paging device. This information includes clock value of the sender (i.e., the paging device) and the paging device's correct device access code. The responding device must be in the page scan state to allow the paging device to connect with it. Once in the page scan state, the responding device will receive the paging packet that provides the clock timing and access code of the paging device. The responding device responds with a page acknowledgment packet. This enables the two devices to form a connection and both devices transition into the connection state. The paging device that has initiated the connection assumes the role of a master device and the responding device assumes the role of a slave device in a new ad hoc network piconet, using the CLK clock timing and access code of the master device.

Each piconet has one master device and up to seven active slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as multiuser gateways to the Internet or to a content server, wherein one device serves as the access point and is connected to an infrastructure network or content server. A user's device that joins a multi-user gateway piconet, does so to enable its user to access the infrastructure network or content server.

To form ad hoc connections, a Bluetooth device has to have the ability to rapidly discover target Bluetooth devices to which the user wishes to connect. In many cases the target device is known, e.g. a headset, and thus the procedure for connection establishment is straightforward. However, in certain cases it is not possible to have information about the target device. Additional problems are created by a crowded environment where many Bluetooth devices are present, which respond to the user device's inquiries.

What is needed a way to rapidly give the user notice of those Bluetooth devices within communication range, and yet not inundate the user with information about those Bluetooth devices that he/she wishes to ignore.

SUMMARY OF THE INVENTION

The invention disclosed gives the user notice of those Bluetooth devices within communication range, and yet it selectively blocks any notice about Bluetooth devices that the user wishes to ignore. In accordance with the invention, Bluetooth server devices can indicate to the user's Bluetooth client device the service that the server device has available by sending service/device icon information to Bluetooth client device. This information can be a value in the class-of-device (CoD) field of a frequency hop synchronization (FHS) packet that it sends during the process of exchanging inquiry and paging packets with the Bluetooth client device. If the server device has begun by transmitting an inquiry packet, then the CoD value will be sent in its paging packet. If the server device is responding to an inquiry, then its CoD value will be in its inquiry response packet.

The service/device icon is a small, graphic bitmap that is displayed on the screen of the client device, having an appearance that serves to describe the service that the server device has to offer. Alternately, the icon can also serve to identify characteristics of the user of the server device, such as business-related or personal characteristics. In either case, the icon bitmap must reside in the client device in order to be displayed on its screen. For conventional services, such as an access point for an Internet gateway or an access point for a printer, standard icon bitmaps can be stored in an icon cache in all Bluetooth client devices. Optionally, new icon bitmaps and their corresponding CoD values can be downloaded from an Internet service provider, such as Nokia Club, to be stored in the icon cache of the client device in association with their CoD values. This can be, for example, a new graphical design of an icon for an existing, assigned CoD value, such as that for a printer. The service/device icon is typically a 16 by 16 pel bitmap. A black and white icon can be stored in a 32-byte memory partition of the receiver's icon cache. An eight bit per pel color icon can be stored in a 256-byte memory partition of the receiver's icon cache. Audible tones can be played when the icon is initially displayed. The tone string can be downloaded from the Internet service provider at the same time as is the icon bitmap and stored in the icon cache of the client device in association with the CoD value.

When the icon is initially displayed on the screen of the client device, a partition is opened in a detected icon buffer to store the status of the icon. A time stamp value is recorded at the start of the display, in association with the received CoD value. Periodically, the time stamp value is compared with the time of day clock of the client device. When the time stamp is older than a threshold value called the lease-time (30 seconds, for example), the icon is removed from the screen and its partition is closed in the detected icon buffer. During the period that the icon remains actively displayed on the screen, if additional FHS packets are received from the same server device containing the same CoD value, the time stamp value is updated to the current time of day value. This enables retaining the display of an icon for a server device that remains in the vicinity of the client device. As soon as the client device moves out of communications range of the server device and no more FHS packets are received, then after the expiration of the lease-time, the icon is removed from the screen.

If the client device has initiated a connection with the server device to carry out SDP searching or other operations, the client device assumes a temporary master role in its new piconet. Most server devices are programmed to request a master/slave role switch if the client device has initiated the connection. Once the client changes to a slave role, it can only remain in its piconet, either as an active slave or a parked slave. (It is possible for the slave to switch between several piconets, when timing information is known.) Thus, the client device is programmed to terminate such connections after completing any necessary SDP searching or other operations. In order to continue displaying icons of server devices within communications range, the client device continues to operate in the inquiry and page scanning modes, detecting the FHS paging packets and FHS inquiry response packets from server devices in its vicinity. When the FHS packets from a given server device are no longer received, then the lease-time interval is started in preparation to remove the corresponding icon from the display.

The detected icon buffer also stores the Bluetooth device address BD_ADDR of the server device, in association with the received CoD value. The ith icon in the detected icon buffer has a device address BD_ADDRi and a CoD value CoDi. The detected icon buffer also stores coordinates, such as the (x,y) coordinates, of the displayed position of the icon with respect to the origin of coordinates on the screen, in association with the received CoD value. The ith icon on the screen has a position (xi,yi) associated in the detected icon buffer with the its CoD value CoDi. Other origins for coordinates can be used, such as the center of the screen. Also, other coordinate systems can be used, such as polar coordinates. A cursor is also displayed on the screen, whose position is represented by coordinates, such as the (X,Y) coordinates with respect to the origin of coordinates on the screen. A pointing device, such as a mouse or a track ball controls the displayed position (X,Y) of the cursor on the screen. When the user presses the mouse button, the (X,Y) coordinates of the cursor are compared with the (x,y) coordinates of each icon in the detected icon buffer. If the cursor coordinates (X,Y) are within range of the ith icon coordinates (xi,yi), then the ith icon is selected. The client device can be programmed to access the device address BD_ADDRi to complete the connection with the corresponding server device and exchange further messages with it. The further messages can include the client device sending an SDP request to the server device to find out information about other files or services, followed by accessing a file from the server device.

Where the server device has initiated the connection by sending inquiry and paging packets to the client device, the server device may use the Bluetooth object push profile (OPP) to push an unsolicited file, such as a business card, to the client device. The client device is programmed to store the unsolicited file in a unsolicited file buffer, associated with the CoD and the BD_ADDR of the sending server device. The detected icon buffer opens a partition for the server device and stores an indication that there is an associated file in the unsolicited file buffer. When the user presses the mouse button, the (X,Y) coordinates of the cursor are compared with the (x,y) coordinates of each icon in the detected icon buffer. If the cursor coordinates (X,Y) are within range of the ith icon coordinates (xi,yi), then the ith icon is selected. The client device can be programmed to check if there is an associated file in the unsolicited file buffer. If there is, that file is accessed and displayed on the screen. This feature enables the server device to send more informative messages to the client device, along with the CoD of the icon bitmap.

The detected icon buffer also stores a server rank value, in association with the received CoD value. The first server device of a given CoD type to be entered into the detected icon buffer will be assigned the a server rank value of "1". Two different server devices having different device addresses BD_ADDR, can offer the same service and will transmit the same CoD value. The client device is programmed to identify this circumstance. The second server device of the same CoD type to be entered into the detected icon buffer will be assigned the a server rank value of "2", and so on. Instead of placing two identical icon bitmaps on the screen, the first displayed icon will have appended to it a numeral indicating how many of that type of server device are in the vicinity. The displayed icon is referred to as a multi-icon.

The detected icon buffer also stores a received signal strength indication (RSSI) for each respective server device listed in the detected icon buffer. Where there are two or more server devices in the detected icon buffer having a given CoD type, the client device is programmed to rank them by their RSSI values. The server rank values of those servers having the same type CoD value are reassigned, in accordance with the RSSI for each server device. The server device with the strongest RSSI will be reassigned a server rank value of "1", and weaker server devices will be assigned consecutively greater values. When the cursor coordinates (X,Y) are within range of the multi-icon's coordinates (xi,yi), then the multi-icon is selected. The client device can be programmed to access the device address BD_ADDRi of the server device with the strongest RSSI to complete the connection with the corresponding server device and exchange further messages with it. As individual server devices move out of communication range of the client device, the respective partition in the detected icon buffer is cleared, and the server rank values are reassigned, as needed.

The RSSI value can be displayed beneath each icon shown on the screen, thereby allowing the user to select server devices having better link quality. Alternately, "color bars" can be presented to represent RSSI values, such as green=good RSSI, yellow=still acceptable, and red=data transmission is not possible. Any kind of indication of RSSI reading is possible (e.g. actual value, number of bars, color etc)

The user can enter CoD values for types of server devices or services to be ignored, such as advertisement broadcasting server devices and certain types of vending machine server devices. These prohibited CoD values are stored in a blocking filter buffer in the client device. When a CoD value is received in an FHS packet, it is compared with the prohibited CoD values and if there is a match, no entry is made in the detected icon buffer, thereby ignoring the prohibited server devices.

There are up to eleven bits available in the CoD field for assignment as service descriptions, yielding up to 2048 different possible services that can be represented. Some subset, for example the six bits of the CoD minor device class subfield, can be used to assign up to 64 service description values.

When the icon serves to identify characteristics of the user of the server device, such as business-related or personal characteristics, the device can be optionally programmed to accept manual changes to the CoD field. The user of the sending device has the ability to select the icon to be sent. Optionally, the server device can be manually reset by its user to indicate in its class-of-device (CoD) field of its FHS packet, that particular types of service/device icon information are available, such as dating/match-making information.

The client device can also be programmed to search for specified class-of-device (CoD) values received from a server device. The client device can match the CoD values received in FHS packets, with an entry in a search list in the client device. For example, the client device can be programmed by its user to search for that particular class-of-device (CoD) value among those CoDs received. When a match is found, the client device is programmed to display the icon bitmap and sound an alarm tone.

In the current Bluetooth specification, an inquiry result is reported over the Host Computer Interface (HCI) only after the inquiry period is over, which is 10.24 seconds. During that period, it may be possible that the client device will move out of the range of the server device. In another aspect of the invention, the receipt of FHS packets is a result event that is reported over the HCI as soon as each new FHS packet arrives. The HCI is programmed to write the received CoD value of the FHS packet in a memory register at the time that the packet arrives. The Host can then read the register and process the CoD value to display the corresponding icon, as described above.

The client device can be programmed by its user to recognize selected class-of-device. (CoD) values and either ignore them or display the corresponding icon bitmap.

In an alternate embodiment of the invention, the service/device icon information can be sent after a connection has been made with the client device, as part of a Service Discovery Protocol (SDP) response packet. The client device can search for interesting services using the Service Discovery Protocol (SDP). When interesting services are found, their service records are accessed by the client device. Icons are included in the service records as an IconURL parameter. Icons can be loaded using hypertext transfer protocol (http). If there is no icon included in the service record of an interesting service, a default icon for its type may be displayed, as identified by the CoD value of the sending device.

The process of retrieving the icon bitmap in the Service Discovery Protocol (SDP) of the alternate embodiment, starts by examining the public browse root of the SDP service registry in the server device. It then follows the hierarchy out to service classes which are the branches of the tree, and from there to the leaf nodes, where individual services are described in service records. To get specific information about the icon bitmap, the client device and the server device exchange messages carried in SDP packets. There are two types of SDP packets, the SDP Service Search Attribute Request packet and the SDP Service Search Attribute Response packet. The SDP Request packet carries the SDP Service Search Attribute Request, which includes a service search pattern and an attribute ID list. The service search pattern is the description of the desired service records containing the icon bitmap information in the server device. The server device specifically searches its registry of for the attribute containing information about the icon bitmap. The server device responds with the service handle of the icon bitmap or a pointer to the icon bitmap. The service handle identifies the service record containing the icon bitmap. Optionally, the service record contains a pointer to the icon bitmap. When the client device receives the icon bitmap, it is displayed on the screen. Optionally, it can also be stored in the client's icon cache.

DISCUSSION OF THE PREFERRED EMBODIMENT

In the following description of the preferred embodiment, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1A:
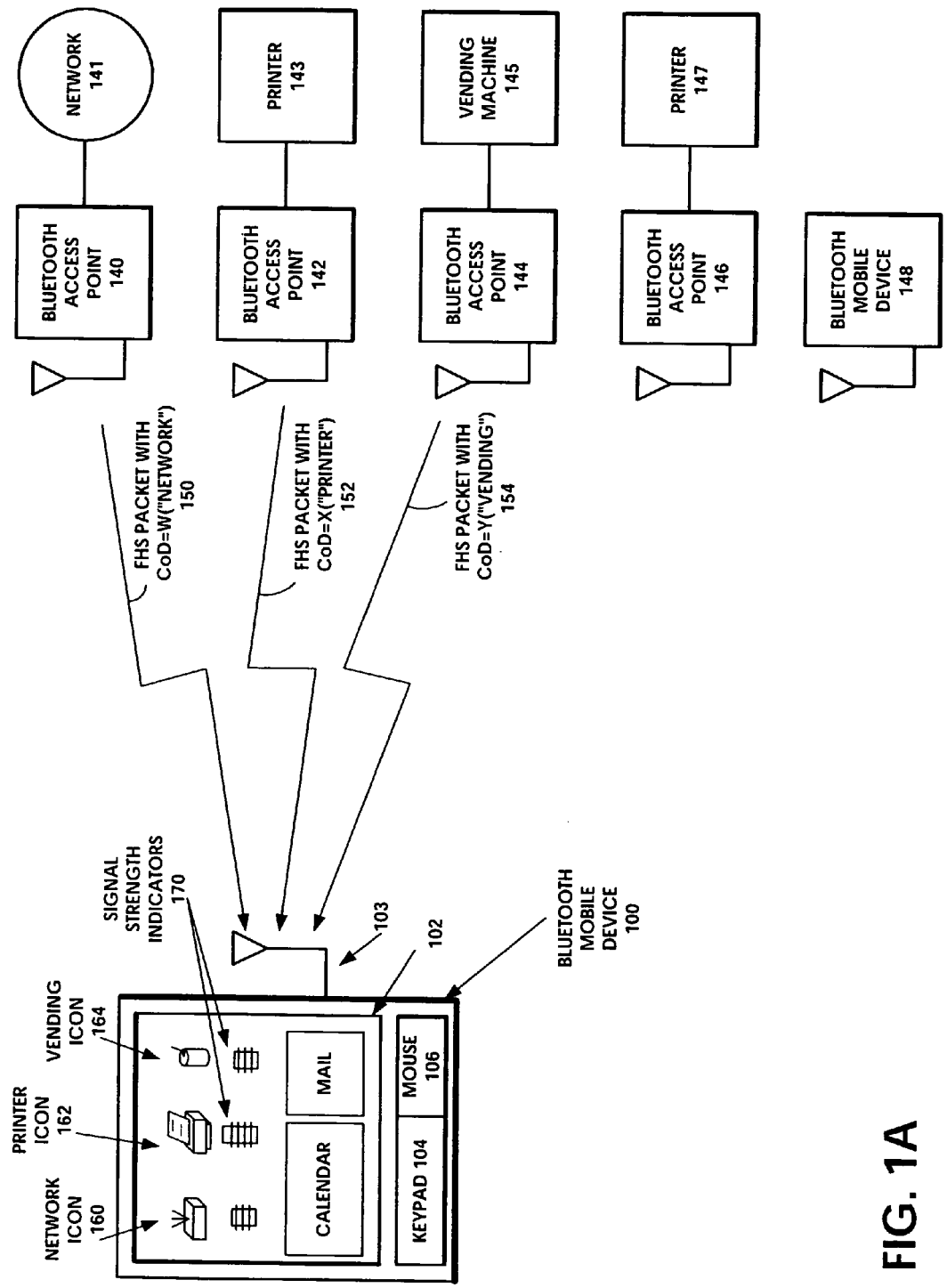
FIG. 1A shows a wireless network diagram of the Bluetooth mobile client device and five server devices, with the mobile device being within Bluetooth communication range of a network access point, a first printer access point, and a vending machine access point, according to an embodiment of the present invention.

The invention disclosed gives the user notice of those Bluetooth devices within communication range, and yet it selectively blocks any notice about Bluetooth devices that the user wishes to ignore. FIG. 1A shows a wireless network diagram of six Bluetooth devices: the user's mobile, client device 100, four access point devices connected to their respective servers, and another mobile device. Access point 140 is connected to the network 141. Access point 142 is connected to the printer 143. Access point 144 is connected to the vending machine 145. Access point 146 is connected to the second printer 147. The second mobile device 148 can be a Bluetooth equipped cellular telephone. In the first location of the mobile device 100 shown in FIG. 1A, the user's mobile device 100 is within the Bluetooth communication range of the network access point 140, the first printer access point 142, and the vending machine access point 144.

The four Bluetooth access point devices 140, 142, 144 and 146 and the Bluetooth mobile device 148 of FIG. 1A are collectively referred to here as "server devices", for convenience. In accordance with the invention, the server devices can indicate to the user's Bluetooth client device the-type of service that the server device has available by sending service/device icon information to Bluetooth client device. This information can be a value in the class-of-device (CoD) field of a frequency hop synchronization (FHS) packet that it sends during the process of exchanging inquiry and paging packets with the Bluetooth client device. If the server device has begun by transmitting an inquiry packet, then the CoD value will be sent in its paging packet. If the server device is responding to an inquiry, then its CoD value will be in its inquiry response packet. The network access point 140 sends the FHS packet 150 to the user's mobile device 100, with a CoD value of "W" indicating by convention that the access point 140 is connected to a network 141. The first printer access point 142 sends the FHS packet 152 to the user's mobile device 100, with a CoD value of "X" indicating by convention that the access point 142 is connected to a printer 143. The vending machine access point 144 sends the FHS packet 154 to the user's mobile device 100, with a CoD value of "Y" indicating by convention that the access point 144 is connected to a vending machine 145.

The user's Bluetooth mobile device 100 of FIG. 1A includes an antenna 103, keypad 104, mouse or pointer device 106, and a display screen 102. The display screen 102 presents calendar functions, mail functions, and other user applications to the user. In accordance with the invention, when the user's device 100 receives the FHS packet 150 with a CoD value="W", a corresponding network icon 160 is displayed on the screen 102. When the user's device 100 receives the FHS packet 152 with a CoD value="X", a corresponding printer icon 162 is displayed on the screen 102. When the user's device 100 receives the FHS packet 154 with a CoD value="Y", a corresponding vending icon 164 is displayed on the screen 102. Signal strength indicators 170 can also be displayed on the screen 102 next to the icons 160, 162, and 164, indicating the relative signal strength of the respective FHS packets 150, 152, and 154.

The service/device icons 160, 162, and 164 in FIG. 1A are each a small, graphic bitmap that is displayed on the screen 102 of the client device 100, having an appearance that serves to describe the service that the respective server device 141, 143, and 145 has to offer. Alternately, an icon can also serve to identify characteristics of the user of the server device, such as business-related or personal characteristics. In either case, the icon bitmap 160, 162, or 164 must reside in the client device 100 in order to be displayed on its screen 102. For conventional services, such as an access point 140 for an Internet gateway or an access point 142 for a printer 143, standard icon bitmaps can be stored in an icon cache 244 in all Bluetooth client devices 100, as shown in FIG. 2.

Figure 2:
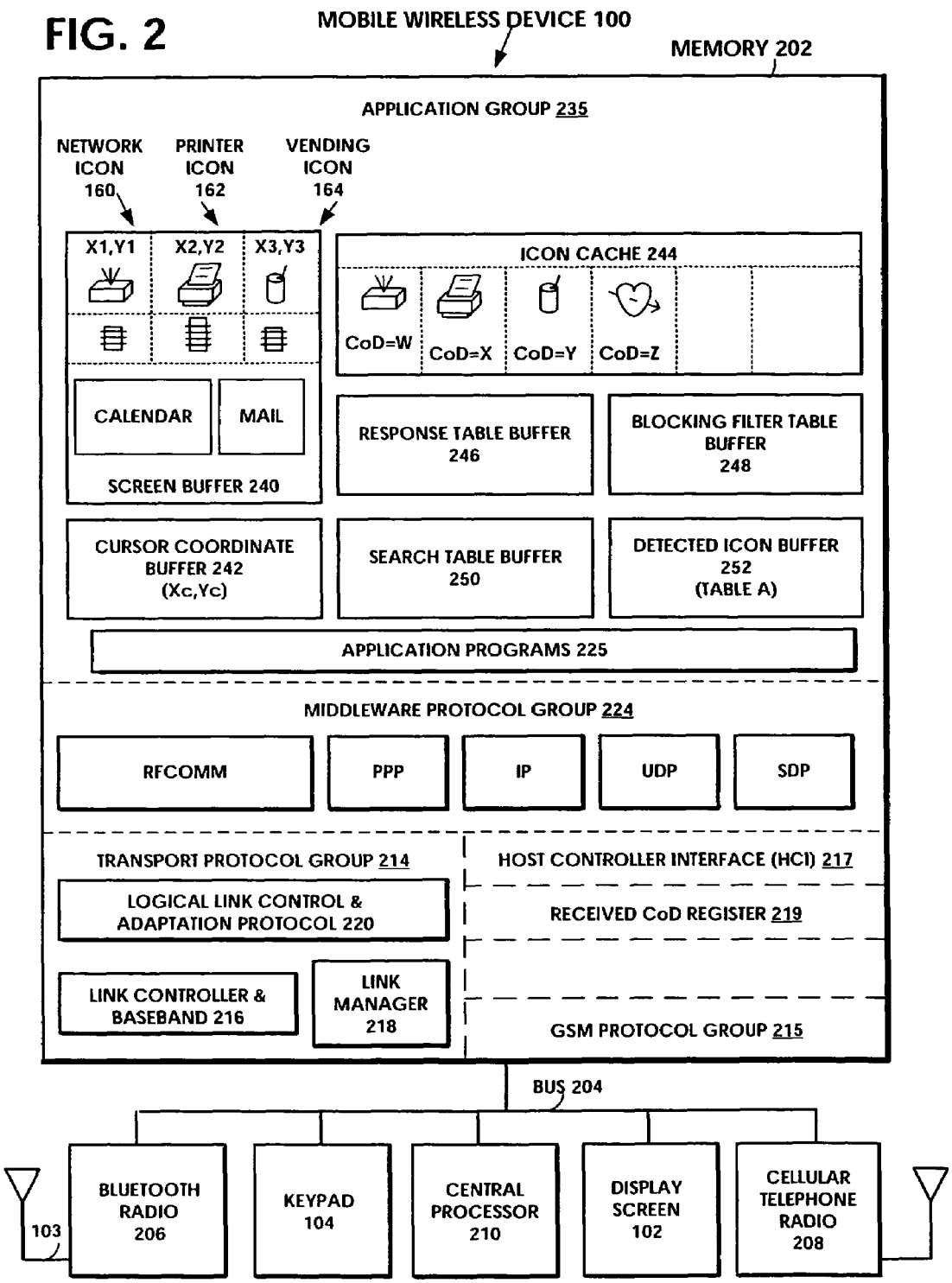
FIG. 2 shows the memory layout of the mobile client device, according to an embodiment of the present invention.

FIG. 2 illustrates the memory and components of the user's mobile wireless device 100, according to an embodiment of the present invention. The user's device can be a Bluetooth equipped cellular telephone, for example. The memory 202 is connected by the bus 204 to the Bluetooth radio 206, the keypad 104, the central processor 210, the display screen 102, and the cellular telephone radio 208. The memory 202 stores programs that are sequences of executable instructions which, when executed in the central processor 210, carry out the methods of the invention. The memory 202 includes the Bluetooth transport group 214 that includes the link controller 216, the link manager 218, and the logical link control and adaptation layer 220.

The memory 202 of FIG. 2 also includes the host controller interface (HCI) 217. In systems where the higher layers are run on a host device's processor and the lower layers on a Bluetooth device, the host controller interface (HCI) 217 provides a standard interface between the higher and lower layers. The host controller interface (HCI) 217 provides event packets used by the lower Bluetooth layers 216, 218, and 220 to inform the higher layers of the host's application group 235 of changes in the lower layers. In accordance with one aspect of the invention, a received CoD register 219 is included in the memory 202, which is associated with the host controller interface (HCI) 217. In the current Bluetooth specification, the receipt of an FHS packet is reported as a result over the Host Computer Interface (HCI) only after the inquiry period is over, which is 10.24 seconds. During that period, it may be possible that the client device will move out of the range of the server device. In accordance with the invention, the receipt of an FHS packet is reported as a result event over the host controller interface (HCI) 217 as soon as new FHS packet arrives. The host controller interface (HCI) 217 is programmed to write the received CoD value of the FHS packet in the received CoD register 219 at the time that the FHS packet arrives. The higher layers of the host's application group 235 can then immediately read the register 219 and process the CoD value to display the corresponding icon, as described above.

The memory 202 of FIG. 2 also includes the GSM protocol group 215 to provide telephony functions for the cellular telephone circuits. The memory 202 also includes the Bluetooth middleware protocol group 224 that includes the RFCOMM, PPP, IP, UDP, and SDP program modules.

The memory 202 of FIG. 2 also includes the application group 235. The application group 235 includes application programs 225 and various memory partitions. The application programs 225 can include GUI applications, wireless application protocol (WAP) programs, and various user applications such as calendar and email programs. The application programs 225 also include programs to carry out the operations of an embodiment of the present invention, as represented by the flow diagrams of FIGS. 3A, 3B, and 3C.

The application group 235 includes a screen buffer 240 showing the relative display positions of the icon bitmaps 160, 162, and 164 on the display screen 102. The network icon 160 has the coordinates X1,Y1. The printer icon 160 has the coordinates X2,Y2. The vending icon 164 has the coordinates X3,Y3. The application group 235 includes a cursor coordinate buffer 242 with the current values of the cursor coordinates Xc,Yc on the display screen 102. The application group 235 includes a response table buffer 246 listing the sending device address BD_ADDR of each FHS packet received.

The application group 235 includes an icon cache 244 storing the icon bitmaps 160, 162, and 164. These bit maps may have been optionally installed by the manufacturer, they may be optionally downloaded from a network service provider such as Nokia Club, or they may be optionally received from server devices such as 140, 142, etc. Icon bitmaps can be stored in the icon cache 244 of the client device 100 in association with their CoD values. New icon bit maps can be, for example, a new graphical design of an icon for an existing, assigned CoD value, such as that for a printer. The service/device icon is typically a 16 by 16 pel bitmap. A black and white icon can be stored in a 32-byte memory partition of the receiver's icon cache 244. An eight bit per pel color icon can be stored in a 256-byte memory partition of the receiver's icon cache 244. Audible tones can be played when the icon is initially displayed. The tone string can be downloaded from the Internet service provider at the same time as is the icon bitmap and stored in the icon cache 244 of the client device 100 in association with the CoD value.

The application group 235 includes a blocking filter table buffer 248 listing those CoD values that the user has selected to be ignored. The application group 235 includes a search table buffer 250 listing those CoD values that the user has selected to be searched.

The application group 235 includes a detected icon buffer 252, which is shown in greater detail in Tables A, B, and C. Tables A, B, and C show the contents of the detected icon buffer 252 for the user's device 100 located at the three respective locations in FIGS. 1A, 1B, and 1C. Tables A, B, and C have the following fields:

[1] the name of the icon's server device (network, printer, vending, etc.);

[2] the (X,Y) coordinates of the displayed location of the icon;

[3] the CoD value for the icon's server;

[4] the BD_ADDR of the icon's server;

[5] the time stamp for the icon;

[6] the server rank for the icon (e.g., 1=first printer, 2=second printer);

[7] the binary yes/no if there is a filter block for the icon;

[8] the address of any associated server push (OPP) file stored for the icon; and

[9] the RSSI strength of the FHS packet for the icon's server device.

TABLE A

Detected Icon Buffer 252 (First Location shown in FIG. 1A)

| Name | Screen Location | CoD Value | BD_ADDR Address | Time Stamp | Server Rank | Filter Block | Associate File | RSSI Strength |
|---|---|---|---|---|---|---|---|---|
| Network AP 140 | X1, Y1 | W | BD_ADDR1 | T1 | 1 | No | Address1 | RSSI1 |
| Printer AP 142 | X2, Y2 | X | BD_ADDR2 | T2 | 1 | No | Address2 | RSSI2 |
| Vending AP 144 | X3, Y3 | Y | BD_ADDR3 | T3 | 1 | No | Address3 | RSSI3 |

TABLE B

Figure 1B:
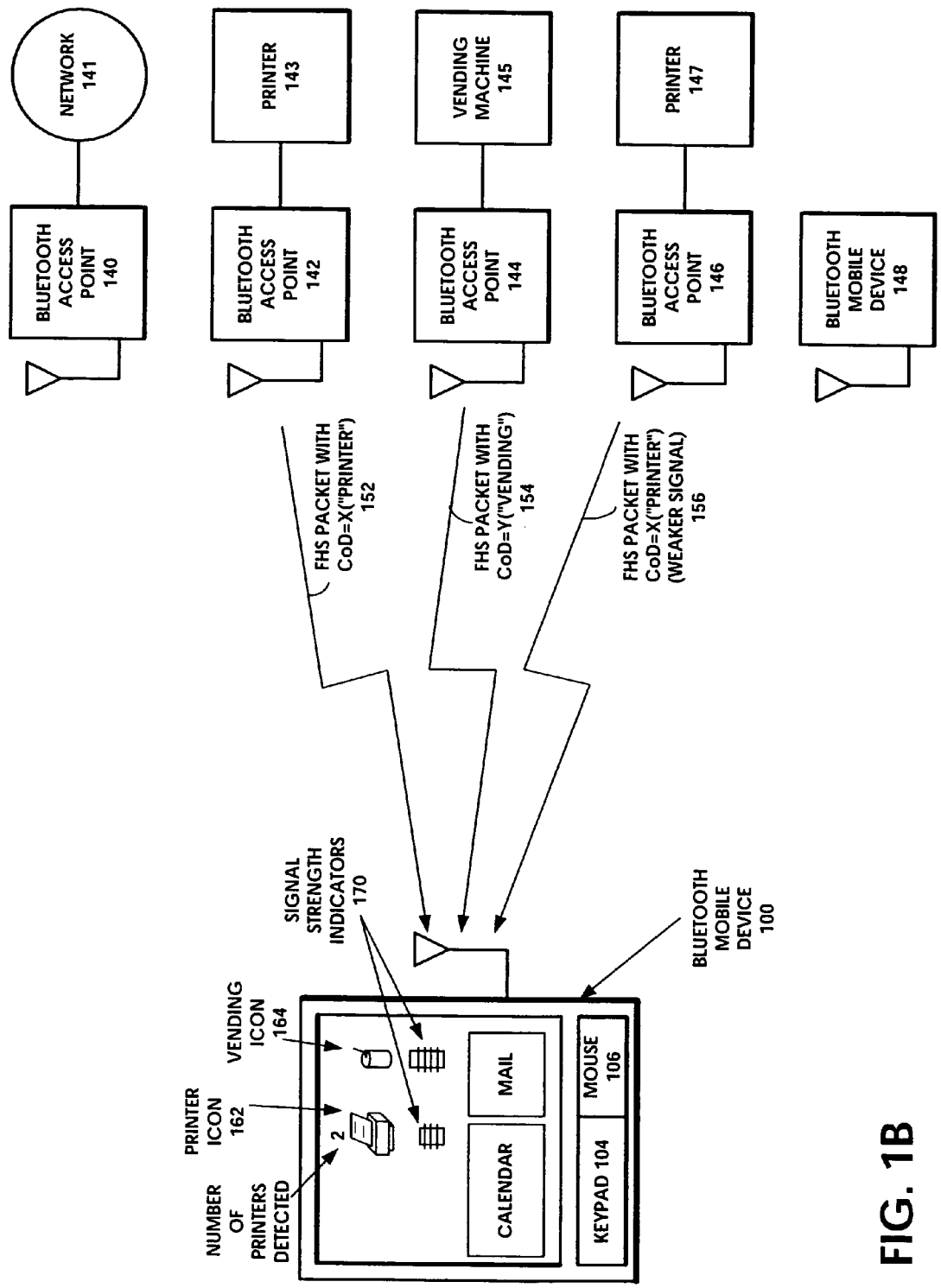
FIG. 1B shows the same wireless network as FIG. 1A, but with the mobile client device having moved out of the range of the network access point and into range with a second printer access point.

Detected Icon Buffer 252 (Second Location shown in FIG. 1B)

| Name | Screen Location | CoD Value | BD_ADDR Address | Time Stamp | Server Rank | Filter Block | Associate File | RSSI Strength |
|---|---|---|---|---|---|---|---|---|
| Printer AP 142 | X2, Y2 | X | BD_ADDR2 | T2 | 1 | No | Address2 | RSSI2 |
| Vending AP 144 | X3, Y3 | Y | BD_ADDR3 | T3 | 1 | No | Address3 | RSSI3 |
| Printer AP 146 | X2, Y2 | X | BD_ADDR5 | T4 | 2 | No | Address4 | RSSI4 |

TABLE C

Figure 1C:
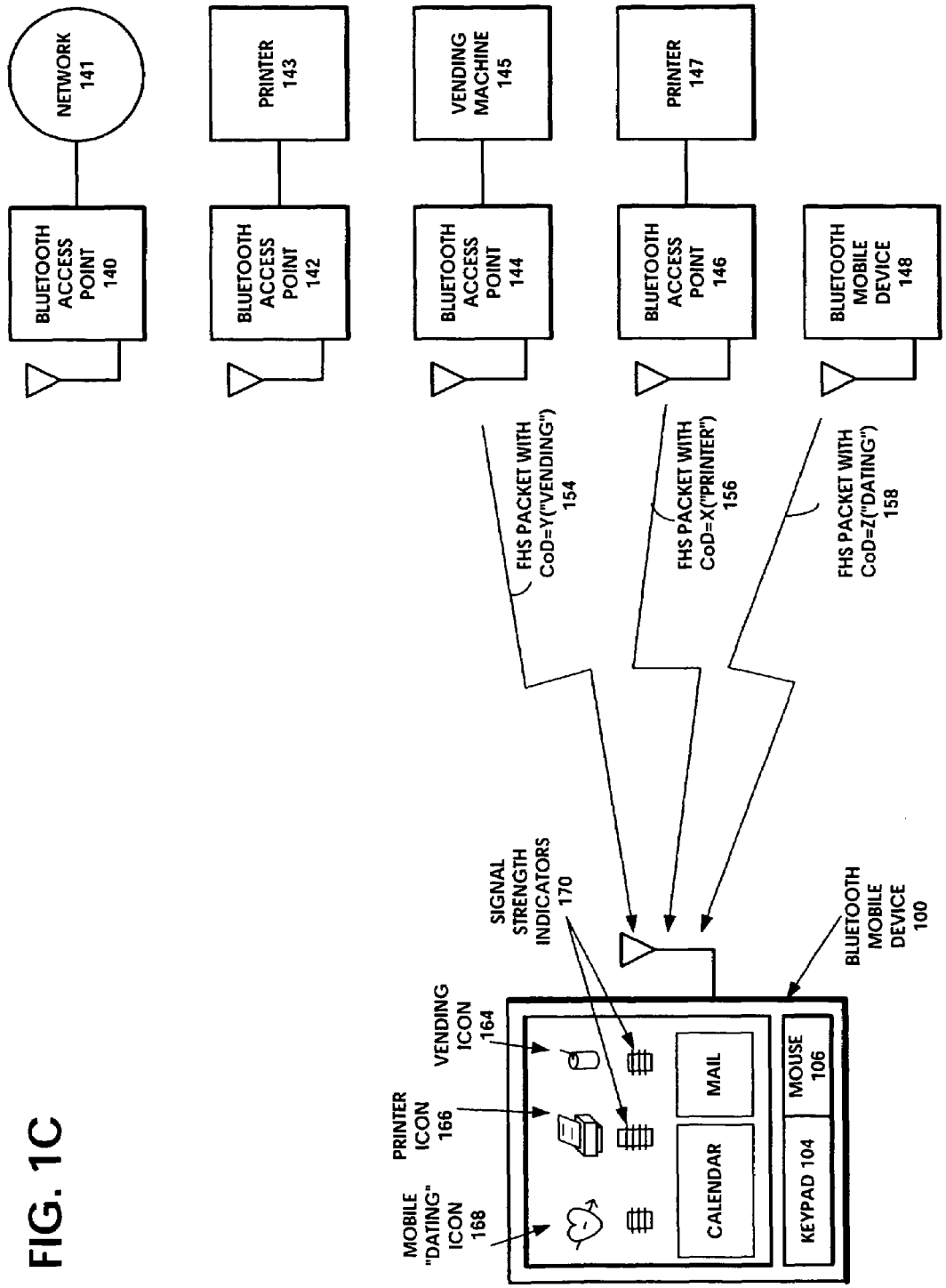
FIG. 1C shows the same wireless network as FIGS. 1A and 1B, but with the mobile client device having further moved out of the range of both the network access point and the first printer access point, and into range with a second mobile device.

Detected Icon Buffer 252 (Third Location shown in FIG. 1C)

| Name | Screen Location | CoD Value | BD_ADDR Address | Time Stamp | Server Rank | Filter Block | Associate File | RSSI Strength |
|---|---|---|---|---|---|---|---|---|
| Vending AP 144 | X3, Y3 | Y | BD_ADDR3 | T3 | 1 | No | Address3 | RSSI3 |

TABLE C-continued

Detected Icon Buffer 252 (Third Location shown in FIG. 1C)

| Name | Screen Location | CoD Value | BD_ADDR Address | Time Stamp | Server Rank | Filter Block | Associate File | RSSI Strength |
|---|---|---|---|---|---|---|---|---|
| Printer AP 146 | X2, Y2 | X | BD_ADDR5 | T4 | 1 | No | Address4 | RSSI4 |
| Mobile Device 148 | X1, Y1 | Z | BD_ADDR5 | T5 | 1 | No | Address5 | RSSI5 |

When the icon 160, for example, is initially displayed on the screen 102 of the client device 100, a partition is opened in a detected icon buffer 252 shown in Table A, to store the status of the icon. Table A illustrates the detected icon buffer 252 for the first location of the user's mobile device 100 shown in FIG. 1A. A time stamp value is recorded at the start of the display, in association with the received CoD value. Periodically, the time stamp value is compared with the time of day clock of the client device. When the time stamp is older than a threshold value called the lease-time (30 seconds, for example), the icon is removed from the screen 102 of the device 100 and its partition is closed in the detected icon buffer 252. During the period that the icon remains actively displayed on the screen 102 of the device 100, if additional FHS packets 150 are received from the same server access point device 140 containing the same CoD value, the time stamp value is updated in the buffer 252 to the current time of day value. This enables retaining the display of an icon for a server device 140 that remains in the vicinity of the client device 100. As soon as the client device 100 moves out of Bluetooth communications range of the server device 140 and no more FHS packets 150 are received, then after the expiration of the lease-time, the icon 160 is removed from the screen 102 of the user's device 100. Optionally, if the icon is annoying, the user can manually remove the icon from the display at an earlier time, if desired.

If the client device 100 has initiated a connection with the server device 140, for example, to carry out SDP searching or other operations, the client device 100 assumes a temporary master role in its new piconet. Most server devices 140, for example, are programmed to request a master/slave role switch if the client device 100 has initiated the connection. Once the client 100 changes to a slave role, it can only remain in its piconet, either as an active slave or a parked slave. (It is possible for the slave to switch between several piconets, when timing information is known.) Thus, the client device 100 is programmed to terminate such connections after completing any necessary SDP searching or other operations. In order to continue displaying icons of server devices 140, for example, within communications range, the client device 100 continues to operate in the inquiry and page scanning modes, detecting the FHS paging packets 150 and FHS inquiry response packets 150 from server devices 140, for example, in its vicinity. When the FHS packets 150 from a given server device 140, for example, are no longer received, then the lease-time interval is started in preparation to remove the corresponding icon 160 from the display screen 102 of the device 100.

FIG. 1B shows the same wireless network as FIG. 1A, but with the mobile client device having moved out of the range of the network access point and into range with a second printer access point. Table B illustrates the detected icon buffer 252 for the second location of the user's mobile device 100 shown in FIG. 1B. Table B shows that the server partition for the network access point 140 is removed from the detected icon buffer 252 since the user's device 100 has moved out of range of the access point 140 and no longer receives FHS packets 150. Correspondingly, the screen 102 of the user's device 100 in FIG. 1B shows that the icon 160 has been removed. Table B also shows that a new server partition for the second printer access point 146 is added to the detected icon buffer 252 since the user's device 100 has moved into range of the access point 146 and is now receiving FHS packets 156.

The detected icon buffer 252 also stores the Bluetooth device address BD_ADDR of the server device 140, for example, in association with the received CoD value "W". The ith icon in the detected icon buffer 252 has a device address BD_ADDRi and a CoD value CoDi. The detected icon buffer 252 also stores the (x,y) coordinates of the displayed position of the icon with respect to the origin of coordinates on the screen 102, in association with the received CoD value. The ith icon on the screen 102 has a position (xi,yi) associated in the detected icon buffer 252 with the its CoD value CoDi. A cursor is also displayed on the screen 102, whose position is represented by (Xc,Yc) coordinates with respect to the origin of coordinates on the screen 102. A pointing device, such as a mouse or a track ball 106 controls the displayed position (Xc,Yc) of the cursor on the screen 102. When the user presses the mouse button, the (Xc,Yc) coordinates of the cursor are compared with the (x,y) coordinates of each icon in the detected icon buffer 252. If the cursor coordinates (Xc,Yc) are within range of the ith icon coordinates (xi,yi), then the ith icon is selected. The client device 100 can be programmed to access the device address BD_ADDRi to complete the connection with the corresponding server device 140, for example, and exchange further messages with it. The further messages can include the client device 100 sending an SDP request to the server device 140, for example, to find out information about other files or services, followed by accessing a file from the server device 140.

Where the server device 140, for example, has initiated the connection by sending inquiry and paging packets 150 to the client device 100, the server device 140 may use the Bluetooth object push profile (OPP) to push an unsolicited file, such as a business card, to the client device 100. The client device 100 is programmed to store the unsolicited file in a unsolicited file buffer in the memory 202 of FIG. 2, associated with the CoD and the BD_ADDR of the sending server device 140, for example,. The detected icon buffer 252 opens a partition for the server device 140 and stores an indication that there is an associated file in the unsolicited file buffer. When the user presses the mouse button 106, the (X,Y) coordinates of the cursor are compared with the (x,y) coordinates of each icon in the detected icon buffer 252. If the cursor coordinates (X,Y) are within range of the ith icon coordinates (xi,yi), then the ith icon is selected. The client device 100 can be programmed to check if there is an associated file in the unsolicited file buffer. If there is, that file is accessed and displayed on the screen 102 of device 100. This feature enables the server device 140, for example, to send more informative messages to the client device 100, along with the CoD of the icon bitmap 160.

The detected icon buffer 252 also stores a server rank value, in association with the received CoD value. The first server device such as the printer access point 142 having a given CoD type to be entered into the detected icon buffer 252, will be assigned the a server rank value of "1". Two different server devices, such as printer access points 142 and 146, having different device addresses BD_ADDR, can offer the same printer service and will transmit the same CoD value. The client device 100 is programmed to identify this circumstance. The second server device 146 of the same CoD type to be entered into the detected icon buffer 252 will be assigned a server rank value of "2", and so on. Instead of placing two identical icon bitmaps on the screen 102 of the user's device 100, the first displayed icon 162 will have appended to it a numeral indicating how many of that type of server device are in the vicinity. The displayed icon 162 in FIG. 1B is referred to as a multi-icon and has the numeral "2" appended to it.

The detected icon buffer 252 also stores a received signal strength indication (RSSI) for each respective server device 140, 142, 144, etc. listed in the detected icon buffer 252. Where there are two or more server devices 142 and 146 in the detected icon buffer 252, having a given CoD type, the client device 100 is programmed to rank them by their RSSI values. The server rank values of those servers 142 and 146 having the same type CoD value are reassigned, in accordance with the RSSI for each server device. The server device 142 with the strongest RSSI will be reassigned a server rank value of "1", and weaker server devices 146 will be assigned consecutively greater values. When the cursor coordinates (X,Y) are within range of the multi-icon's coordinates (xi,yi), then the multi-icon is selected. The client device 100 can be programmed to access the device address BD_ADDRi of the server device 142 with the strongest RSSI to complete the connection with the corresponding server device 142 and exchange further messages with it. As individual server devices move out of communication range of the client device 100, the respective partition in the detected icon buffer 252 is cleared, and the server rank values are reassigned, as needed.

The RSSI value can be displayed as a signal strength indicator 170 beneath each icon 160, 162, and 164 shown on the screen 102 in FIG. 1A, thereby allowing the user to select server devices having better link quality. Alternately, "color bars" can be presented to represent RSSI values, such as green=good RSSI, yellow=still acceptable, and red=data transmission is not possible.

The user can enter CoD values for types of server devices to be ignored, such as advertisement broadcasting server devices and certain types of vending machine server devices. These prohibited CoD values are stored in a blocking filter buffer 248 in the client device 100 of FIG. 2. When a CoD value is received in an FHS packet, it is compared with the prohibited CoD values in the blocking filter buffer 248 and if there is a match, no entry is made in the detected icon buffer 252, thereby ignoring the prohibited server devices.

There are up to eleven bits available in the CoD field for assignment as service descriptions, yielding up to 2048 different possible services that can be represented. Some subset, for example the six bits of the CoD minor device class subfield, can be used to assign up to 64 service description values.

When the icon serves to identify characteristics of the user of the server device, such as business-related or personal characteristics, the user of the sending device has the ability to select the icon to be sent. The server device can be manually reset by its user to indicate in its class-of-device (CoD) field of its FHS packet, that particular types of service/device icon information are available, such as a CoD value of "Z" representing "dating/match-making" information. FIG. 1C shows the same wireless network as FIGS. 1A and 1B, but with the mobile client device 100 having further moved out of the range of both the network access point 140 and the first printer access point 142, and into range with a second mobile device 148. The second mobile device 148 can be a Bluetooth equipped cellular telephone that has been selectively programmed by its user to transmit a CoD value of "Z" in its FHS packets 158 indicating a "dating/match-making" status for its user. In this example, the icon 168 shown in FIG. 1C, is a standard icon that is stored in the icon cache 244 of the client device 100 of FIG. 2. Table C illustrates the detected icon buffer 252 for the third location of the user's mobile device 100 shown in FIG. 1C. Table C shows that the server partition for the printer access point 142 is removed from the detected icon buffer 252 since the user's device 100 has moved out of range of the access point 142 and no longer receives FHS packets 152. Correspondingly, the screen 102 of the user's device 100 in FIG. 1C shows that the icon 162 no longer indicates that there are two printers being detected. Table C also shows that a new server partition for the mobile device 148 is added to the detected icon buffer 252, since the user's device 100 has moved into range of the mobile device 148 and is now receiving FHS packets 158.

The client device 100 can also be programmed to search for specified class-of-device (CoD) values received from a sending device 148, for example. The client device 100 can match the CoD values received in FHS packets 158, with an entry in a search list in the search table buffer 250 of the client device 100. For example, the client device 100 can be programmed by its user to search for that particular class-of-device (CoD) value "Z" for "dating/match-making" among those CoDs received in FHS packets. When a match is found, the client device 100 is programmed to display the icon bitmap 168 and sound an alarm tone.

In an alternate embodiment of the invention, the service/device icon information can be sent after a connection has been made with the client device 100, as part of a Service Discovery Protocol (SDP) response packet. The client device 100 can search for interesting services using the Service Discovery Protocol (SDP). When interesting services are found, their service records are accessed by the client device 100. Icons can be included in the service records as an IconURL parameter. Icons can be loaded using the hypertext transfer protocol (http). If there is no icon included in the service record of an interesting service, a default icon for its type may be displayed, as identified by the CoD value of the sending device 140, for example.

The process of retrieving the icon bitmap in the Service Discovery Protocol (SDP) of the alternate embodiment, starts by examining the public browse root of the SDP service registry in the server device 140, for example. It then follows the hierarchy out to service classes which are the branches of the tree, and from there to the leaf nodes, where individual services are described in service records. To get specific information about the icon bitmap, the client device 100 and the server device 140, for example, exchange messages carried in SDP packets. There are two types of SDP packets, the SDP Service Search Attribute Request packet and the SDP Service Search Attribute Response packet. The SDP Request packet carries the SDP Service Search Attribute Request, which includes a service search pattern and an attribute ID list. The service search pattern is the description of the desired service records containing the icon bitmap information in the server device. The server device specifically searches its registry of for the attribute containing information about the icon bitmap. The server device responds with the service handle of the icon bitmap or a pointer to the icon bitmap. The service handle identifies the service record containing the icon bitmap. Optionally, the service record contains a pointer to the icon bitmap. When the client device 100 receives the icon bitmap, it is displayed on the screen 102. Optionally, it can also be stored in the client's icon cache 244.

Figure 3A:
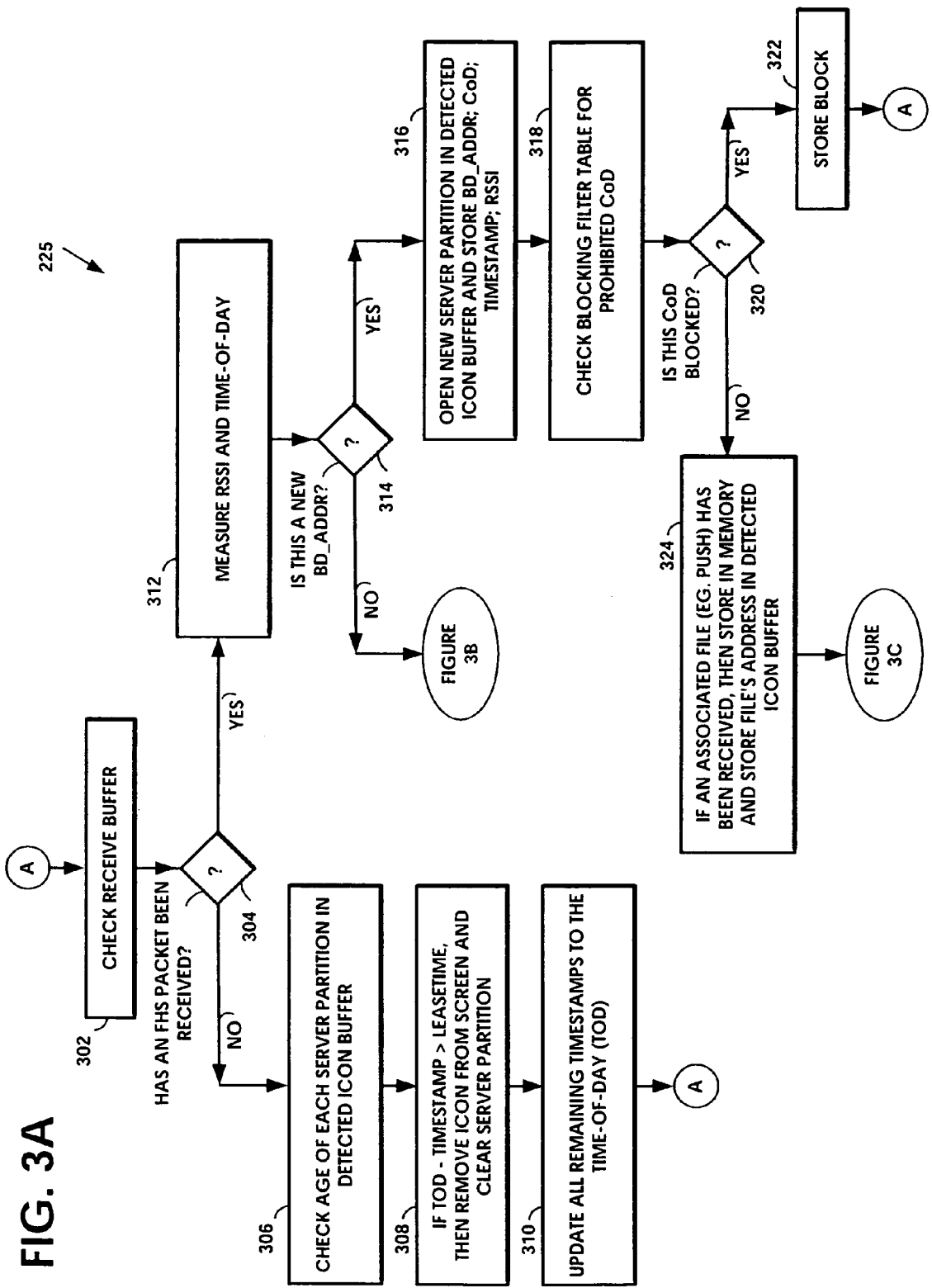
FIGS. 3A, 3B, and 3C show the flow diagram of the operation of the mobile client device, according to an embodiment of the present invention.
Figure 3B:
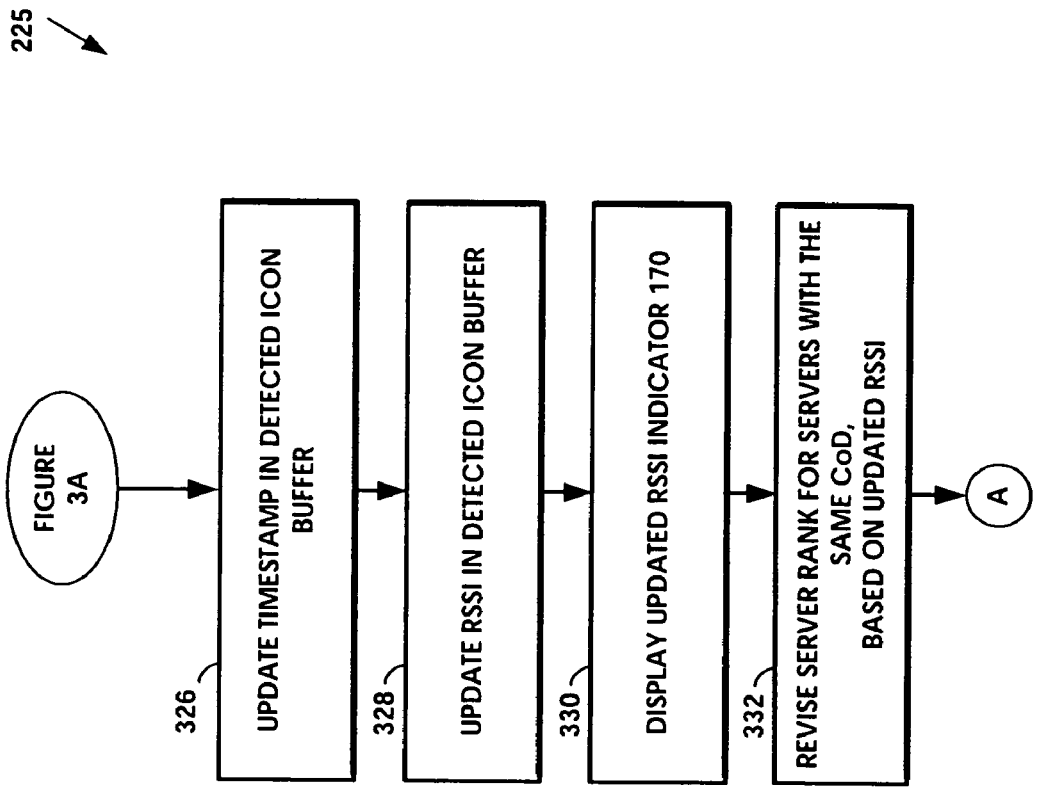
Figure 3C:
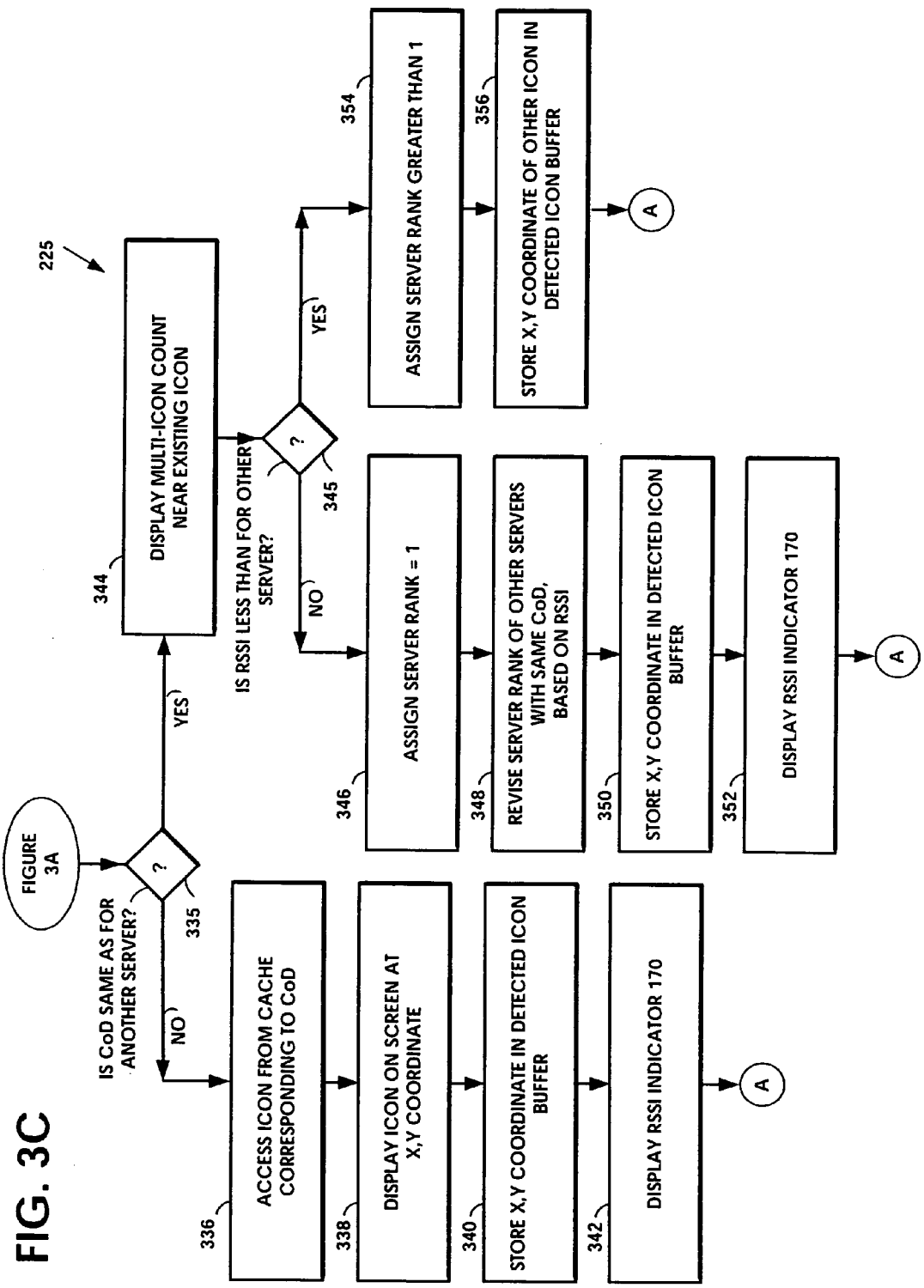

The application programs 225 of FIG. 2 include programs in the user's device 100 to carry out the operations of an embodiment of the present invention, as represented by the flow diagrams of FIGS. 3A, 3B, and 3C. The entry point "A" of the program of FIG. 3A starts with step 302, to check the receive buffer in the user's device 100 for any FHS packets, such as packet 150 from the network access point 140 of FIG. 1A. The receipt of an FHS packet is reported as a result event over the host controller interface (HCI) 217 as soon as new FHS packet arrives. The host controller interface (HCI) 217 is programmed to write the received CoD value of the FHS packet in the received CoD register 219 at the time that the FHS packet arrives. The higher layers of the host's application group 235 can then immediately read the register 219 and process the CoD value to display the corresponding icon. Step 304 determines if an FHS packet has been received. If it has not been received, then the program flows to a loop including steps 306, 308, and 310 to age the timestamp values in the detected icon buffer 252. Step 306 checks the age of each server partition in the detected icon buffer 252. Step 308 determines if the difference between the time of day (TOD) and the timestamp is greater than the lease-time (e.g, 30 seconds) and if it is, then it removes the icon from the screen and clears the server partition in the detected icon buffer 252. Step 310 updates all the remaining timestamps to the current time-of-day (TOD).

If step 304 of FIG. 3A determines that an FHS packet has been received, then the program flows to step 312 to measure the RSSI strength and the time-of-day of the receipt of the FHS packet. The program then flows to step 314 to determine if the FHS packet has a new BD_ADDR sending device address. If it does not have a new device address, then the program flows to step 326 in FIG. 3B. Step 326 updates the timestamp in detected icon buffer 252. Step 328 updates the RSSI in the detected icon buffer 252. Step 330 displays the updated RSSI indicator 170. Step 332 revises the server rank for servers with the same cod, based on the updated RSSI. The program then flows to the entry point "A" in FIG. 3A.

If step 314 in FIG. 3A determines that the FHS packet does not have a new BD_ADDR sending device address, then the program flows to step 316 in FIG. 3B. Step 316 opens a new server partition in detected icon buffer 252 and stores the BD_ADDR; CoD; timestamp; and RSSI for the received FHS packet. Step 318 checks the blocking filter table 248 to determine if the CoD is has been selected by the user as prohibited and therefore to be blocked. Step 320 determines if the CoD is blocked. If it is, the program flows to step 322 to store the blocked indication in the detected icon buffer 252 and then to return to the entry point "A" in FIG. 3A. No corresponding icon is displayed on the screen 102 and the sending server device is effectively ignored.

If step 320 determines that the CoD is not blocked, then the program flows to step 324. Step 324 determines if an associated file (e.g. a push file) has been received from the same sending server device. If it has, then the program stores the associated file in memory 202 and stores the associated file's address in the detected icon buffer 252. The program then flows to step 335 of FIG. 3C. Step 335 determines if the CoD is the same as that for another server currently represented in the detected icon buffer 252. If the CoD is new and not the same as another in the detected icon buffer 252, then the program flows to step 336. Step 336 accesses an icon from the icon cache 244 corresponding to the CoD. Step 338 displays the icon on the screen 102 at the X,Y coordinate. Step 340 stores the X,Y coordinate in the detected icon buffer 252. Step 342 displays the RSSI indicator 170 indicating the strength of the received FHS packet. The program then returns to the entry point "A" in FIG. 3A.

If step 335 of FIG. 3C determines that the CoD is not new, but is the same as that for another server currently represented in the detected icon buffer 252, then the program flows to step 344. Step 344 displays the multi-icon count near existing icon, such as the value "2" displayed near the printer icon 162 in FIG. 1B. Then step 345 determines if the RSSI is less than that for another server currently represented in the detected icon buffer 252. If the RSSI is not less, but is the greatest, then the program flows to step 346. Step 346 assigns the highest server rank of "1" to the received FHS packet. Then step 348 revises the server ranks of the other servers having the same CoD, based on the RSSI. Step 350 stores the X,Y coordinate of the icon in the detected icon buffer 252. Step 352 displays the RSSI indicator 170 indicating the strength of the received FHS packet. The program then returns to the entry point "A" in FIG. 3A.

If step 345 of FIG. 3C determines that the RSSI is less than that for another server currently represented in the detected icon buffer 252, then the program flows to step 354. Step 354 assigns a lower server rank greater than "1" to the received FHS packet. Step 356 stores the X,Y coordinate of other icon in detected icon buffer 252, corresponding to the other server currently represented having the same CoD. The program then returns to the entry point "A" in FIG. 3A.

The resulting invention rapidly gives the user notice of those Bluetooth devices within communication range, and yet does not inundate the user with information about those Bluetooth devices that he/she wishes to ignore.

Although a specific embodiment of the invention has been disclosed, those having skill in the art will understand that changes can be made to that specific embodiment without departing from the spirit and the scope of the invention.

What is claimed is:
1. A method, comprising:
maintaining in a device one or more icons associated with short-range services;
receiving icon information relating to an available service as a value in a field of a packet from a source device providing wireless short-range services within a wireless short-range communications range of the device;
accessing an icon corresponding to the received icon information without establishing a wireless short-range connection between the device and the source device;
displaying the icon corresponding to the icon information;
periodically determining whether the source device is within the short-range communications range of the device without establishing a wireless short-range connection between the device and the source device;
removing the display of the icon after a predetermined time interval following the determination that the source device is no longer within the wireless short-range communications range of the device;
receiving an indication of selection of the displayed icon from a user of the device; and initiating establishment of a wireless short-range connection with the source device based on the received packet in response to receiving the selection indication from the user of the device.

2. The method of claim 1, wherein said receiving step further comprises:
receiving from the source device, the value in a paging packet.

3. The method of claim 1, wherein said receiving step further comprises:
receiving from the source device, the value in an inquiry response packet.

4. The method of claim 1, wherein said displaying step further comprises:
displaying a graphic bitmap on a screen of the device, having an appearance that serves to describe a service that the source device has to offer.

5. The method of claim 1, wherein said displaying step further comprises:
displaying a graphic bitmap on a screen of the device, having an appearance that serves to identify characteristics of a user of the source device.

6. The method of claim 1, which further comprises:
storing the icon in the device.

7. The method of claim 6, which further comprises:
downloading new icons from a network service provider and storing them in association with their icon information.

8. The method of claim 7, which further comprises:
downloading from a network service provider, representations of audible tones to be played when an icon is displayed, and storing the representations of audible tones in association with the icon information.

9. The method of claim 1, wherein said receiving step further comprises:
receiving the icon information as a value in a field of a packet from the source device;
reporting the value over a host controller interface when the packet is received; and
processing the value to display the corresponding icon.

10. The method of claim 1, wherein said displaying step further comprises:
selectively not displaying the icon based on user-defined prohibited values of the icon information.

11. The method of claim 1, which further comprises:
storing the icon information in a detected icon buffer.

12. The method of claim 11, wherein said storing the icon information further comprises:
storing a time stamp value at the start of the display of the icon;
periodically comparing the time stamp value with a time of day clock of the device; and
removing the display of the icon when the time stamp is older than a threshold lease-time value.

13. The method of claim 12, wherein said storing the icon information further comprises:
updating the time stamp value when additional signals are received from the source device; and
retaining the display of the icon for the source device as long as it remains in communication range of the device.

14. The method of claim 11, wherein said storing the icon information further comprises:
storing a first server rank value for a first source device of a given type icon information;
identifying a second source device having a different device address and said given type of icon information;
storing a second server rank value for the second source device; and
displaying a single icon on the screen representing the first and second source devices.

15. The method of claim 14, which further comprises:
displaying in association with the single icon, the number of source devices detected having the given type icon information.

16. The method of claim 1, which further comprises:
storing prohibited icon information values;
comparing received icon information values with the prohibited icon information values; and
ignoring source devices having the prohibited icon information values.

17. The method of claim 1, which further comprises:
storing specified icon information values to be searched;
comparing received icon information values with the specified icon information values;
displaying an icon bitmap when a match is found between a received icon information value and a specified icon information value.

18. The method of claim 17, which further comprises:
sounding an alarm tone when a match is found.

19. The method of claim 17, which further comprises:
sending a message to the source device when a match is found between a received icon information value and a specified icon information value.

20. The method of claim 1, which further comprises:
said receiving icon information as a value is in a field of a connection establishment packet.

21. The method of claim 1, which further comprises:
said receiving icon information as a value is in a field of a connection initiation packet.

22. An apparatus, comprising:
a storage in a device configured to maintain one or more icons associated with short-range services;
a receiver in the device, configured to receive icon information relating to an available service as a value in a field of a packet from a source device providing wireless short-range services within a wireless short-range communications range of the device, the information characterizing the source device;
a processor in the device, configured to access an icon corresponding to the received icon information without establishing a wireless short-range connection between the device and the source device;
a display in the device, configured to display the icon corresponding to the icon information while within short-range communications range of the source device;
said processor configured to remove the display of the icon after a predetermined time interval following leaving the short-range communications range of the source device;
said processor configured to receive an indication of selection of the displayed icon from a user of the device; and
said processor configured to initiate establishment of a wireless short-range connection with the source device based on the received packet in response to receiving the selection indication from the user of the device;
wherein the processor is configured to periodically determine whether the source device is within the short-range communications range of the device without establishing a wireless short-range connection between the device and the source device.

23. The apparatus of claim 22, wherein said icon information is a value in a paging packet.

24. The apparatus of claim 22, wherein said icon information is a value in an inquiry response packet.

25. The apparatus of claim 22, wherein said icon is a graphic bitmap having an appearance that serves to describe a service that the source device has to offer.

26. The apparatus of claim 22, wherein said icon is a graphic bitmap having an appearance that serves to identify characteristics of a user of the source device.

27. The apparatus of claim 22, which further comprises:
a buffer storing the icon in the device.

28. The apparatus of claim 27, which further comprises:
said buffer storing new icons received by the receiver from a network service provider.

29. The apparatus of claim 27, which further comprises:
said buffer storing representations of audible tones to be played when an icon is displayed.

30. A computer program product, comprising:
a computer readable medium;
program code in said computer readable medium for maintaining in a device one or more icons associated with short-range services;
program code in said computer readable medium for receiving icon information relating to an available service as a value in a field of a packet from a source device providing wireless short-range services within a wireless short-range communications range of the device;
program code in said computer readable medium for accessing an icon corresponding to the received icon information without establishing a wireless short-range connection between the device and the source device;
program code in said computer readable medium for displaying the icon corresponding to the icon information;
program code in said computer readable medium for periodically determining whether the source device is within a short-range communications range of the device without establishing a wireless short-range connection between the device and the source device;
program code in said computer readable medium for removing the display of the icon after a predetermined time interval following the determination that the source device is no longer within the short-range communications range of the device;
program code in said computer readable medium for receiving an indication of selection of the displayed icon from a user of the device; and
program code in said computer readable medium for initiating establishment of a wireless short-range connection with the source device based on the received packet in response to receiving the selection indication from the user of the device.

31. The computer program product of claim 30, wherein said icon information is a value in a paging packet.

32. The computer program product of claim 30, wherein said icon information is a value in an inquiry response packet.

33. The computer program product of claim 30, wherein said icon is a graphic bitmap having an appearance that serves to describe a service that the source device has to offer.

34. The computer program product of claim 30, wherein said icon is a graphic bitmap having an appearance that serves to identify characteristics of a user of the source device.

35. The computer program product of claim 30 which further comprises:
program code in said computer readable medium for storing the icon in the device.

36. The computer program product of claim 35, which further comprises:
program code in said computer readable medium for downloading new icons from a network service provider and storing them in association with their icon information.

37. The computer program product of claim 35, which further comprises:
program code in said computer readable medium for downloading from a network service provider, representations of audible tones to be played when an icon is displayed, and storing the representations of audible tones in association with the icon information.

38. An apparatus, comprising:
means for maintaining one or more icons associated with short-range services;
means for receiving icon information relating to an available service as a value in a field of a packet from a source device providing wireless short-range services within a wireless short-range communications range, the information characterizing the source device;
means for accessing an icon corresponding to the received icon information without establishing a wireless short-range connection with the source device;
means for displaying the icon corresponding to the icon information while within short-range communications range of the source device;
means for removing the display of the icon after a predetermined time interval following leaving the short-range communications range of the source device;
means for receiving an indication of selection of the displayed icon from a user; and
means for initiating establishment of a wireless short-range connection with the source device based on the received packet in response to receiving the selection indication from the user; and
means for periodically determining whether the source device is within the short-range communications range of the device without establishing a wireless short-range connection between the device and the source device.

* * * * *